United States Patent
Kim et al.

(10) Patent No.: US 8,958,805 B2
(45) Date of Patent: Feb. 17, 2015

(54) METHOD OF MANAGING TERMINAL AND CONTROLLING INTERFERENCE IN SMALL BASE STATION

(75) Inventors: Jae Heung Kim, Daejeon (KR); Kyoung Seok Lee, Daejeon (KR); Jae Young Ahn, Daejeon (KR); Yeong Jin Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 415 days.

(21) Appl. No.: 12/994,347

(22) PCT Filed: Jun. 12, 2009

(86) PCT No.: PCT/KR2009/003160
§ 371 (c)(1),
(2), (4) Date: Nov. 23, 2010

(87) PCT Pub. No.: WO2009/151296
PCT Pub. Date: Dec. 17, 2009

(65) Prior Publication Data
US 2011/0065442 A1    Mar. 17, 2011

(30) Foreign Application Priority Data

Jun. 12, 2008 (KR) .................. 10-2008-0055402
Jun. 16, 2008 (KR) .................. 10-2008-0056401
May 20, 2009 (KR) .................. 10-2009-0043975

(51) Int. Cl.
*H04W 72/00* (2009.01)
*H04W 84/04* (2009.01)
(Continued)

(52) U.S. Cl.
CPC ............ *H04W 84/045* (2013.01); *H04W 12/06* (2013.01); *H04W 48/02* (2013.01); *H04W 72/04* (2013.01)
USPC .......................................... 455/450

(58) Field of Classification Search
USPC ........... 455/434, 435.1–435.3, 436–444, 450; 370/328, 338, 329
See application file for complete search history.

(56) References Cited

U.S. PATENT DOCUMENTS 8,570,956 B2 * 10/2013 Park et al. ...................... 370/329
2007/0140178 A1 * 6/2007 Jung et al. ...................... 370/335
(Continued)

FOREIGN PATENT DOCUMENTS

EP          1965597 A1     9/2008
KR       2003-0017840      3/2003
(Continued)

*Primary Examiner* — Brandon Miller
(74) *Attorney, Agent, or Firm* — Nelson Mullins Riley & Scarborough LLP; Anthony A. Laurentano, Esq.; Dipti Ramnarain, Esq.

(57) ABSTRACT

A method of managing a terminal and controlling an interference in a small base station is provided. The small base station, including: an access preamble control unit to assign a unique preamble for each terminal registered in the small base station; a transmitting/receiving unit to receive a random access request message from each of the terminals through the unique preamble, to transmit a reply message to each of the terminals, and to receive information about each of the terminals and a Radio Resource Control (RRC) connection request Message from each of the terminals in response to the reply message; and a terminal verification unit to verify whether each of the terminals is a registered terminal using the information about each of the terminals.

9 Claims, 5 Drawing Sheets

(51) Int. Cl.
*H04W 12/06* (2009.01)
*H04W 48/02* (2009.01)
*H04W 72/04* (2009.01)

(56) References Cited

U.S. PATENT DOCUMENTS

| | | | |
|---|---|---|---|
| 2008/0130588 A1* | 6/2008 | Jeong et al. | 370/335 |
| 2009/0011769 A1* | 1/2009 | Park et al. | 455/450 |
| 2010/0002590 A1* | 1/2010 | Park et al. | 370/241 |
| 2010/0009682 A1* | 1/2010 | Iwamura et al. | 455/436 |
| 2010/0014468 A1* | 1/2010 | Lee et al. | 370/329 |
| 2010/0202402 A1* | 8/2010 | Dalsgaard et al. | 370/331 |
| 2010/0222023 A1* | 9/2010 | Aoyama et al. | 455/411 |

FOREIGN PATENT DOCUMENTS

| | | |
|---|---|---|
| KR | 2003-0022276 | 3/2003 |
| KR | 10-2005-0065285 | 6/2005 |
| WO | 2005/065214 A2 | 7/2005 |
| WO | 2007/040449 A1 | 4/2007 |
| WO | 2007/136339 A2 | 11/2007 |

* cited by examiner

METHOD OF MANAGING TERMINAL AND CONTROLLING INTERFERENCE IN SMALL BASE STATION

RELATED APPLICATIONS

This application is a 35 U.S.C. §371 national stage filing of PCT Application No. PCT/KR2009/003160 filed on Jun. 12, 2009, which claims priority to, and the benefit of, Korean Patent Application No. 10-2008-0055402 filed on Jun. 12, 2008, Korean Patent Application No. 10-2008-0056401 filed on Jun. 16, 2008 and Korean Patent Application No. 10-2009-0043975 filed on May 20, 2009. The contents of the aforementioned applications are hereby incorporated by reference.

TECHNICAL FIELD

The present invention relates to a method of managing a terminal and controlling an interference in a small base station, and more particularly, to a terminal management method for terminal registration and access and an interference control method among adjacent base stations and a small station which is used for improvement of a system service performance and a hierarchical base station structure in a cellular system to provide a packet service.

BACKGROUND ART

In a cellular system in a conventional art, a small base station may be managed and controlled by only a service provider.

A $3^{rd}$ Generation Partnership Project (3GPP), however, may use a small base station (or Home (e) Node B, Closed Subscriber Group (CSG) cell) and a broadband base station (or Macro (e) Node B) for a hierarchical base station structure to improve a spectral efficiency of an entire Long Term Evolution (LTE) system or extend a service area of a broadband base station.

In this instance, a small base station may be for a small service area. Also, a method where a subscriber of a small base station registers and operates a terminal in a corresponding small base station managed by an operator may be used.

For example, with respect to a residential small base station, a service may be provided to terminals of a family using a small base station, or provided to users designated by a user of the small base station.

Accordingly, a method and apparatus that may manage registration, access, connection, and the like between a terminal and a small base station is required.

DISCLOSURE OF INVENTION

Technical Problem

An aspect of the present invention provides a small base station and a small base station control method which may access a terminal or connect to other terminals that may be provided with a service only by performing a random access process.

An aspect of the present invention also provides a small base station and a small base station control method which may access a terminal or connect to other terminals that may be provided with a service without a random access process.

An aspect of the present invention also provides a small base station and a small base station control method which may transmit downlink information to a terminal that may be provided with a service by simply transmitting a downlink receiving request message to the terminal without a paging process in a conventional art.

Technical Solution

According to an aspect of the present invention, there is provided a small base station, including: an access preamble control unit to assign a unique preamble for each terminal registered in the small base station; a transmitting/receiving unit to receive a random access request message from each of the terminals through the unique preamble, to transmit a reply message to each of the terminals, and to receive information about each of the terminals and a Radio Resource Control (RRC) connection request Message from each of the terminals in response to the reply message; and a terminal verification unit to verify whether each of the terminals is a registered terminal using the information about each of the terminals, wherein the transmitting/receiving unit makes an RRC connection with each of the terminals in response to the RRC connection request message, when each of the terminals is the registered terminal.

According to another aspect of the present invention, there is provided a small base station, including: a resource allocation unit to allocate a resource request uplink and a scheduling identifier for each terminal registered in the small base station; an uplink resource control unit to allocate an uplink resource to each of the terminals, when an uplink resource request message is received; a transmitting/receiving unit to receive the uplink resource request message transmitted from each of the terminals through the resource request uplink, to transmit the received uplink resource request message to the uplink resource control unit, and to receive information transmitted through the uplink resource allocated by the uplink resource control unit, from each of the terminals.

Advantageous Effects

According to an embodiment of the present invention, a small base station and a small base station control method may access a terminal or connect to other terminals that may be provided with a service only by performing a random access process.

Also, according to an embodiment of the present invention, a small base station and a small base station control method may access a terminal or connect to other terminals that may be provided with a service without a random access process.

Also, according to an embodiment of the present invention, a small base station and a small base station control method may transmit downlink information to a terminal that may be provided with a service by simply transmitting a downlink receiving request message to the terminal without a paging process in a conventional art.

MODE FOR THE INVENTION

Figure 1:
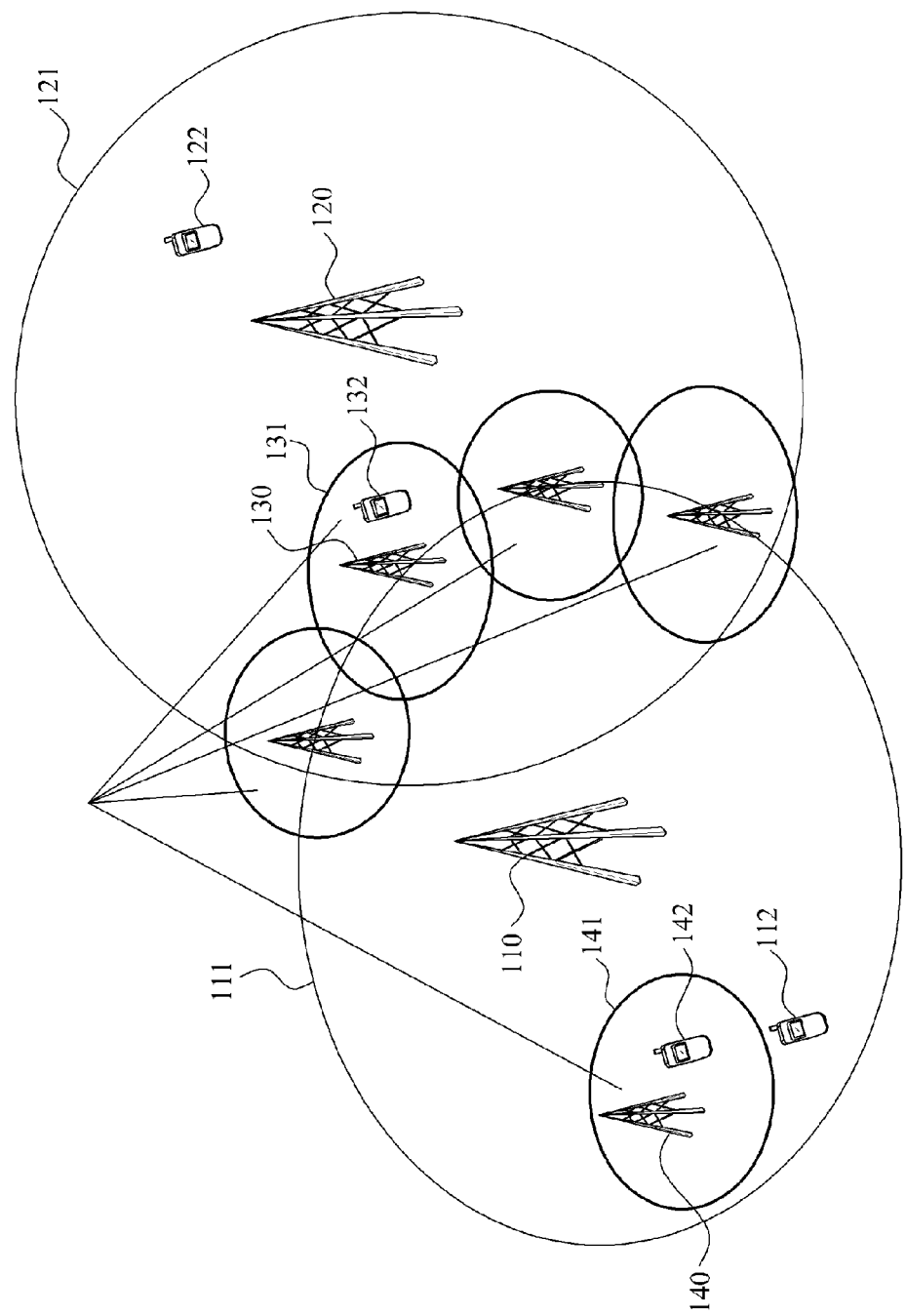
FIG. 1 is a diagram illustrating an example of a hierarchical base station environment including a small base station according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a diagram illustrating an example of a hierarchical base station environment including a small base station according to an embodiment of the present invention.

As illustrated in FIG. 1, the hierarchical base station environment may include a plurality of macro base stations 110 and 120, and a plurality of small base stations 130 and 140.

The plurality of macro base stations 110 and 120 may have service areas 111 and 121 relatively greater than service areas of the plurality of small base stations 130 and 140. Also, the plurality of macro base stations 110 and 120 may provide an information transmitting/receiving service to terminals 112 and 122 located in the service areas 111 and 121.

Also, the small base stations 130 and 140 may set a border area 131 of the macro base stations 110 and 120, or a particular area 141, located in the service area 111 and 121 of the macro base stations 110 and 120, as a service area. Accordingly, the small base stations 130 and 140 may provide an information transmitting/receiving service to terminals 132 and 142 located in the service areas 131 and 141 which are relatively smaller than the service areas 111 and 121 of the macro base stations 110 and 120.

A portion of the small base stations 130 and 140 may provide a service to a limited service area, and a terminal where a service is allowed or a terminal where an access is allowed. Here, the service may denote the information transmitting/receiving service. For example, a residential small base station (or Home (e) Node B) only for the terminal where the service is allowed may enable a user using a small base station to manage a terminal registration, a terminal access, a terminal connection, and the like under management of an operator.

Also, a portion of the small base stations 130 and 140 may not be required to maintain an uplink physical layer synchronization among terminals in a random service area to obtain an uplink orthogonality in an Orthogonal Frequency Division Multiplexing (OFDM)/Orthogonal Frequency Division Multiple Access (OFDMA) (or Single Carrier Frequency Division Multiple Access (SC-FDMA)) system.

For example, a small base station having a small service area where signals, transmitted from a random point in a service area, arrive a base station within a Cyclic Prefix (CP) in a symbol, defined by a system, may not be required to maintain the uplink physical layer synchronization.

The small base station where the maintenance of the uplink physical layer synchronization is not required may control the service to start using only downlink receiving request message or using only a simplified random access process, without a paging process or a random access process. For this, the small base station may configure a parameter indicating whether to activate an uplink physical layer synchronization maintenance function, or set a separate information bit indicating whether uplink physical layer synchronization maintenance is required. Accordingly, an uplink physical layer synchronization maintenance operation of each terminal in the small base station may be controlled.

That is, the random access process may be based on a contention-free access in the small base station. Also, an uplink service or a downlink service may be provided without a separate random access process. Also, when a registered terminal is in an idle state, the service may start without a general paging process.

Figure 2:
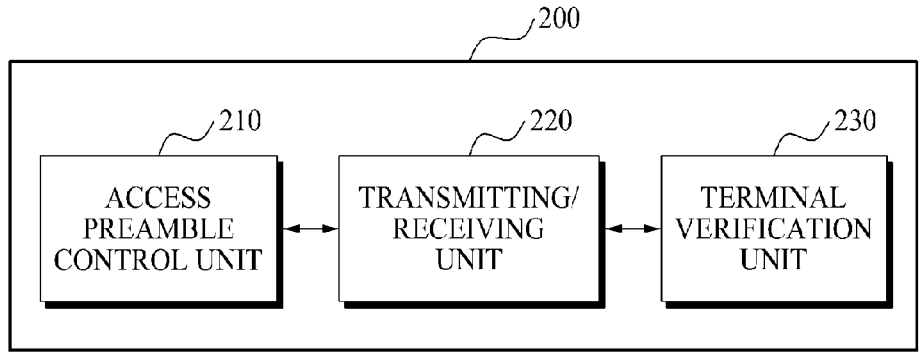
FIG. 2 is a diagram illustrating a configuration of a small base station according to an embodiment of the present invention.

FIG. 2 is a diagram illustrating a configuration of a small base station 200 according to an embodiment of the present invention.

The small base station 200 may provide a service to a limited service area, and a terminal where a service is allowed or an accessible terminal. The small base station 200 may include an access preamble control unit 210, a transmitting/receiving unit 220, and a terminal verification unit 230.

The access preamble control unit 210 may assign a unique preamble to a terminal where a service is allowed with respect to the small base station 200, an accessible terminal, or a terminal group. In this instance, the access preamble control unit 210 may assign a preamble index or an identifier to the terminal or terminal group within an available range of a preamble for a random access process. Accordingly, the terminal where the unique preamble is assigned may avoid contention or reduce a contention level in the small base station 200, and thereby may enable the random access process to be performed.

Also, the access preamble control unit 210 may assign the unique preamble to the terminal, when the terminal or the terminal group is registered or when the service is allowed or the access is made. Also, the access preamble control unit 210 may reassign the unique preamble through a separate process.

The transmitting/receiving unit 220 may receive a random access request message from the terminal or the terminal group through the unique preamble, and transmit a reply message to the terminal or the terminal group in response to the random access request message.

Also, the transmitting/receiving unit 220 may receive information about the terminal and a Radio Resource Control (RRC) connection request Message from the terminal in response to the reply message, and transmit the information to the terminal verification unit 230 to verify whether the terminal is the terminal where the service is allowed or the accessible terminal. When the terminal is the terminal where the service is allowed or the accessible terminal, the transmitting/receiving unit 220 may make an RRC connection with the terminal in response to the RRC connection request Message.

Also, the transmitting/receiving unit 220 may transmit the reply message and an information request message to verify whether the terminal is the terminal where the service is allowed or the accessible terminal.

Accordingly, the information about the terminal may be used to verify whether the terminal is the terminal where the service is allowed or the accessible terminal, or may be unique identification information of the terminal.

The terminal verification unit 230 may verify whether the terminal is the terminal where the service is allowed or the accessible terminal by comparing the information about the terminal with information about a registered terminal.

Figure 3:
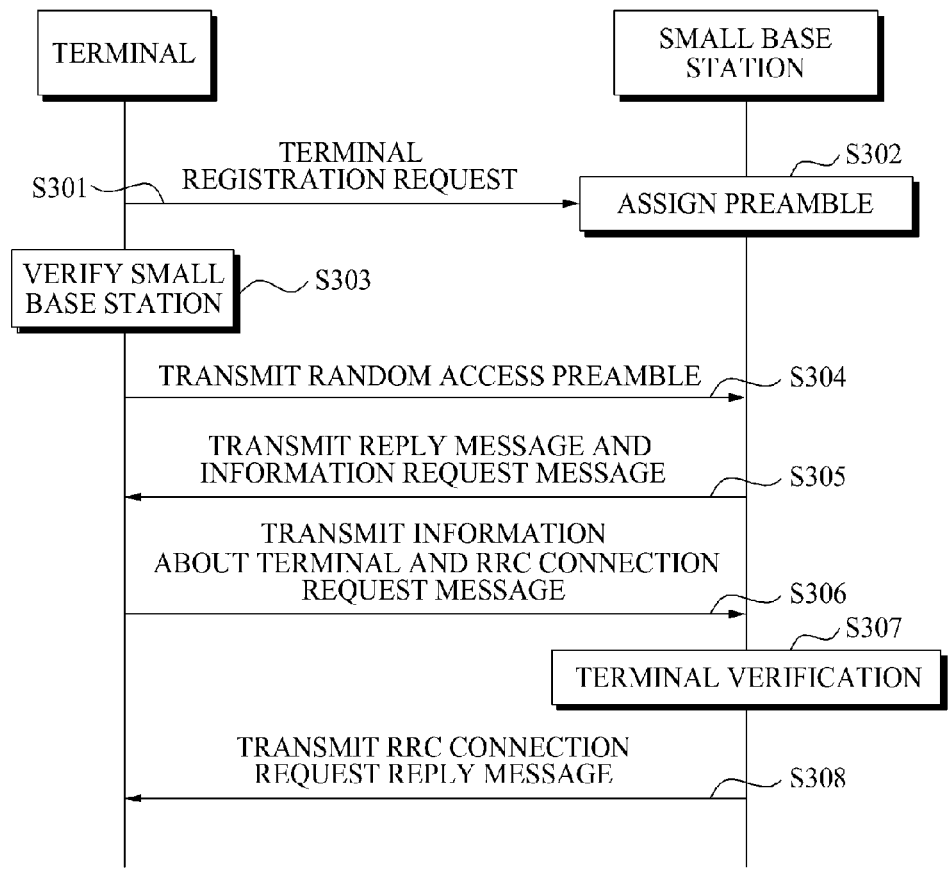
FIG. 3 is a flowchart illustrating an operation of a small base station according to an embodiment of the present invention.

FIG. 3 is a flowchart illustrating an operation of a small base station 200 according to an embodiment of the present invention.

In operation S301, an access preamble control unit 210 may receive a terminal registration request from a terminal where a service with respect to the small base station 200 is allowed or an accessible terminal.

In operation S302, the access preamble control unit 210 may assign an identifier or a unique access preamble index in an available random access preamble group to the terminal where the service is allowed, when performing the terminal registration request, a service allowance, or an access authentication process in operation S301.

In operation S303, the terminal which desires to transmit/receive information may verify whether a small base station is a small base station where a service is allowed, an accessible small base station, or a separately registered small base station from among surrounding small base stations.

In operation S304, the transmitting/receiving unit 220 may receive a random access preamble, which is transmitted to the small base station verified in operation S303, using the identifier or the random access preamble index assigned in operation S302.

That is, the terminal may perform a random access process with respect to the small base station using the unique access preamble assigned in operation S302. Accordingly, when a macro base station performs a handover to a small base station, a contention-free random access process may be performed without a random access preamble resource that the small base station assigns for the contention-free random access process according to a handover command.

In operation S305, the transmitting/receiving unit 220 may transmit a replay message to the terminal in response to the random access preamble received in operation S304. For example, the replay message may be a random access process reply message.

Also, the transmitting/receiving unit 220 may selectively transmit the reply message and information request message. The information request message may be used to verify whether the terminal is a terminal where the service is allowed or an accessible terminal based on the random access preamble used in operation S304.

In operation S306, the transmitting/receiving unit 220 may receive information about the terminal and RRC connection request message transmitted by the terminal to the small base station in response to the reply message transmitted in operation S305.

In this instance, the information about the terminal may be used to verify whether the terminal is the terminal where the service is allowed, the accessible terminal, or a separately registered terminal, or may be may be unique identification information of the terminal. Also, the unique identification information of the terminal may include at least one of information for contention resolution, information to verify a compromised terminal, and unique identification terminal information. The unique identification information of the terminal may be a process controlled by a Media Access Control (MAC) layer of a wireless access protocol layer 2 as opposed to an RRC layer of a layer 3.

In operation S307, a terminal verification unit 230 may verify whether the terminal is the terminal where the service is allowed, the accessible terminal, or the separately registered terminal using the information about the terminal received in operation S306.

In operation S308, the transmitting/receiving unit 220 may transmit an RRC connection request reply message to the terminal, when the terminal is verified as the terminal where the service is allowed, the accessible terminal, or the separately registered terminal, and thereby may make RRC connection with the terminal in operation S307. Also, when the terminal is not verified as the terminal where the service is allowed, the accessible terminal, or the separately registered terminal in operation S307, the transmitting/receiving unit 220 may transmit information associated with a rejection of the RRC connection request to the terminal. In this instance, the transmitting/receiving unit 220 may further transmit, to the terminal, information about whether the terminal is the terminal where the service is allowed, the accessible terminal, or the separately registered terminal.

Figure 4:
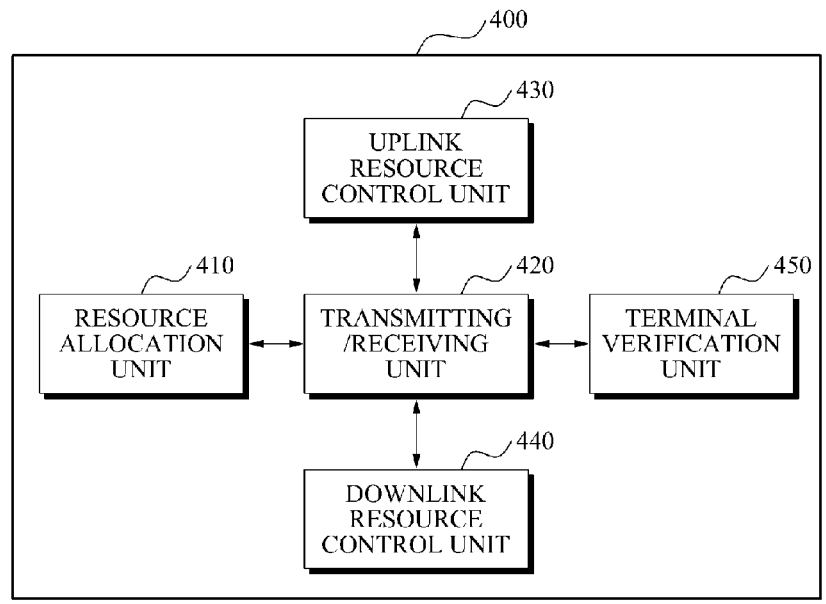
FIG. 4 is a diagram illustrating a configuration of a small base station according to another embodiment of the present invention.

FIG. 4 is a diagram illustrating a configuration of a small base station 400 according to another embodiment of the present invention.

The small base station 400 may not require maintenance of an uplink physical layer synchronization among terminals. As illustrated in FIG. 4, the small base station 400 may include a resource allocation unit 410, a transmitting/receiving unit 420, an uplink resource control unit 430, and a downlink resource control unit 440, and a terminal verification unit 450.

The resource allocation unit 410 may allocate a resource request uplink and a scheduling identifier for each terminal where a service with respect to the small base station 400 is allowed, for each accessible terminal, for each separately registered terminal, or for each terminal group.

The transmitting/receiving unit 420 may receive physical layer information or an uplink resource request message transmitted from each of the terminals through the resource request uplink, and transmit the received uplink resource request message to the uplink resource control unit 430. Also, the transmitting/receiving unit 420 may receive information, transmitted through an uplink resource allocated by the uplink resource control unit 430, from each of the terminals.

Also, the transmitting/receiving unit 420 may receive the information from each of the terminals, through the resource request uplink allocated by the resource allocation unit 410, or through an uplink resource allocated by the uplink resource control unit 430.

When the uplink resource request message is received, the uplink resource control unit 430 may allocate the uplink resource to each of the terminals. Also, the uplink resource control unit 430 may transmit a terminal information transmission request message to each of the terminals, when retransmitting the information after discontinuing the transmission of the information.

The uplink resource control unit 430 may transmit the terminal information transmission request message to each of the terminals when allocating the uplink resource to each of the terminals. In this instance, the transmitting/receiving unit 420 may transmit terminal information, transmitted from each of the terminals, to the terminal verification unit 450 in response to the terminal information transmission request message.

The downlink resource control unit 440 may inform to each of the terminals that downlink information is to be received using the scheduling identifier, when the downlink information to be transmitted to each of the terminals exists. In this instance, the uplink resource control unit 430 may allocate the uplink resource to each of the terminals. When the uplink resource is allocated, the transmitting/receiving unit 420 may transmit the downlink information to each of the terminals through the uplink resource.

The terminal verification unit 450 may verify whether each of the terminals is a terminal where a service is allowed, an accessible terminal, or a separately registered terminal, using the terminal information. When each of the terminals is not verified as the terminal where the service is allowed, the accessible terminal, or the separately registered terminal, the uplink resource control unit 430 may discontinue allocating the uplink resource, or withdraw the allocated uplink resource.

Figure 5:
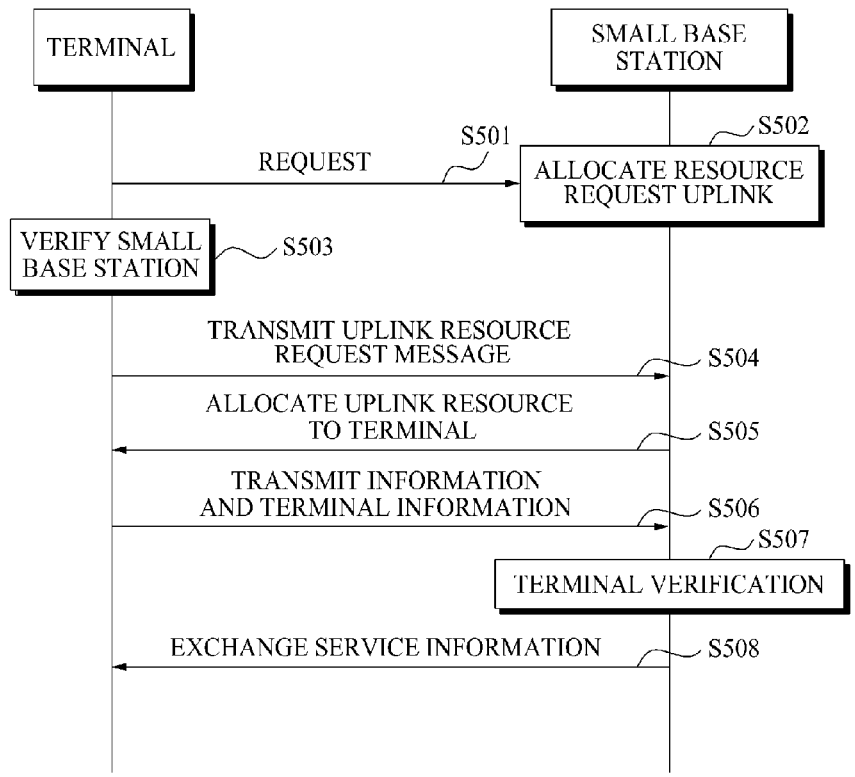
FIG. 5 is a flowchart illustrating an operation of transmitting information to a small base station according to another embodiment of the present invention.

FIG. 5 is a flowchart illustrating an operation of transmitting information to a small base station 400 according to another embodiment of the present invention.

In operation S501, a resource allocation unit 410 may receive a request from a terminal where a service with respect to the small base station 400 is allowed, an accessible terminal, or a separately registered terminal. The request may be associated with a service allowance, an access authentication, a registration, and the like.

In operation S502, the resource allocation unit 410 may allocate a resource request uplink resource to the terminal or a terminal group, when performing a process of the service allowance, the access authentication, or the registration request received in operation S501. In this instance, the resource allocation unit 410 may allocate a unique scheduling identifier to the terminal or the terminal group.

In operation S503, a terminal which desires to transmit information may verify whether the small base station 400 is a small base station where the service is allowed, an accessible small base station, or a separately registered small base station.

In operation S504, a transmitting/receiving unit 420 may receive an uplink resource request message, transmitted to the terminal verified in operation S503, through the resource request uplink allocated in operation S502.

In operation S505, an uplink resource control unit 430 may allocate an uplink resource to the terminal in response to the uplink resource request message received in operation S504. In this instance, the uplink resource control unit 430 may further transmit a terminal information transmission request message, when retransmitting the information after discontinuing the transmission of the information.

In operation S506, the transmitting/receiving unit 420 may receive information, transmitted through the uplink resource allocated in operation S505. When the terminal information transmission request message is transmitted to the terminal in operation S505, the transmitting/receiving unit 420 may further receive terminal information of the terminal.

In this instance, the terminal information may be used to verify whether the terminal is a terminal where a service with respect to the small base station 400 is allowed, an accessible terminal, or a separately registered terminal, or may be may be unique identification information of the terminal.

In operation S507, a terminal verification unit 450 may verify whether the terminal is the terminal where the service is allowed, the accessible terminal, or the separately registered terminal.

In operation S508, the uplink resource control unit 430 may maintain the uplink resource and exchange service information, when the terminal is verified as the terminal where the service is allowed, the accessible terminal, or the separately registered terminal in operation S507. Also, when the terminal is not verified as the terminal where the service is allowed, the accessible terminal, or the separately registered terminal in operation S507, the uplink resource control unit 430 may discontinue allocating the uplink resource or withdrawing the uplink resource, and may discontinue the service or perform a separate verification process.

Figure 6:
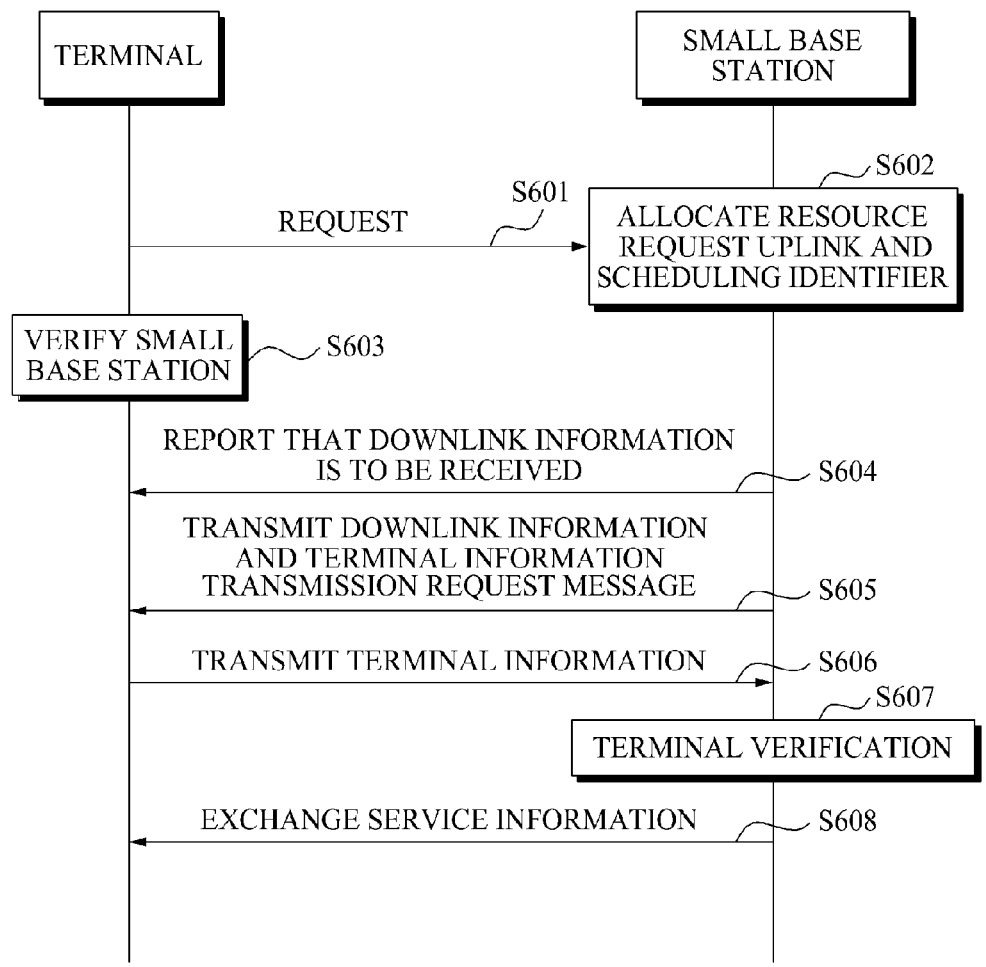
FIG. 6 is a flowchart illustrating an operation of transmitting information to a terminal from a small base station according to embodiment of the present invention.

FIG. 6 is a flowchart illustrating an operation of transmitting information to a terminal from a small base station 400 according to another embodiment of the present invention.

In operation S601, a resource allocation unit 410 may receive a request from a terminal where a service with respect to the small base station 400 is allowed, an accessible terminal, or a separately registered terminal. The request may be associated with a service allowance, an access authentication, a registration, and the like.

In operation S602, the resource allocation unit 410 may allocate a scheduling identifier and a resource request uplink resource to the terminal or a terminal group, when performing a process of the service allowance, the access authentication, or the registration request received in operation S601.

In operation S603, a terminal which desires to transmit/receive information may verify whether the small base station 400 is a small base station where the service is allowed, an accessible small base station, or a separately registered small base station.

In operation S604, a downlink resource control unit 440 may inform to the terminal that downlink information is to be received using the scheduling identifier allocated in operation S602.

In operation S605, an uplink resource control unit 430 may allocate an uplink resource to the terminal that may be informed the downlink reception from the downlink resource control unit 440 in operation S604. Also, the uplink resource control unit 430 may transmit downlink information. In this instance, the uplink resource control unit 430 may further transmit a terminal information transmission request message, when retransmitting the downlink information after discontinuing the transmission of the downlink information.

When the terminal information transmission request message is transmitted to the terminal in operation S605, the transmitting/receiving unit 420 may receive terminal information from the terminal in operation S606.

In operation S607, a terminal verification unit 450 may verify whether the terminal is the terminal where the service is allowed, the accessible terminal, or the separately registered terminal, using the terminal information received in operation S606.

In operation S608, the uplink resource control unit 430 may maintain the uplink resource and exchange service information, when the terminal is verified as the terminal where the service is allowed, the accessible terminal, or the separately registered terminal in operation S607 or when the receiving in operation S606 is not performed. Also, when the terminal is not verified as the terminal where the service is allowed, the accessible terminal, or the separately registered terminal in operation S607, the uplink resource control unit 430 may discontinue allocating the uplink resource or withdrawing the uplink resource, and may discontinue the service or perform a separate verification process.

Also, a small base station according to an embodiment of the present invention may use a ciphering or integrity protection function between the small base station and a terminal without transmitting/receiving a message as illustrated in FIGS. 3, 5, and 6. In this instance, terminal information to verify a terminal may not be exchanged and a terminal information transmission request may not be generated.

As described above, in a method of managing a terminal and controlling an interference in a small base station according to the present invention, a terminal may perform a simplified random access process, or a registration, an access, and a connection between the small base station and the terminal where a service is allowed may be controlled.

Accordingly, the small base station may control and manage the terminal in a manner similar to when an RRC connection is made, even when the small base station and the terminal are in an idle state. Also, the small base station may configure the terminal to be in a state of 'always on' that may instantly start the service.

Also, when the small base station is replaced with a more simple base station structure, for example, a relay node or a relay station, a mobile communication network may be more efficiently established. In this instance, an interface of the relay station may be defined by the base station, the terminal, and a wireless access protocol.

Figure 7:
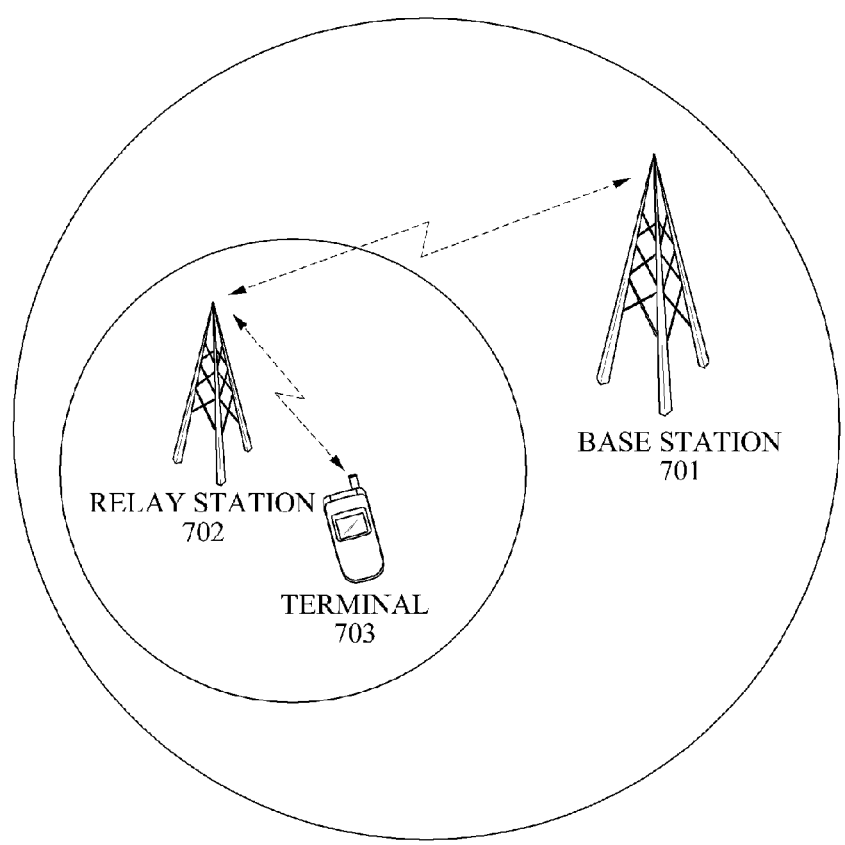
FIG. 7 is a diagram illustrating an example of a service structure to provide a mobile communication service to a terminal using a relay station located in a base station.

FIG. 7 is a diagram illustrating an example of a service structure to provide a mobile communication service to a terminal 703 using a relay station 702 located in a base station 701.

The relay station 702 may have an entire or a portion of an RRC function of a wireless access protocol layer 3. Also, the relay station 702 may be geographically fixed or be moving.

As illustrated in FIG. 7, when the relay station 702 may be located between the terminal 703 and the base station 701, and allocate and manage a wireless resource with respect to terminals in a service area, a method of managing a terminal and controlling an interference in a small base station may use the terminal 703, the relay station 702, and the base station 701 to reduce a processing delay and improve a system performance. The relay station 702 may have an entire or a portion of an RRC function of a wireless access protocol layer 3.

That is, the relay station 702 may provide the terminal 703 in the service area of the relay station 702 with a management method such as a service allowance, an access authentication, a registration, or a connection between the terminal 703 and the relay station 702 based on a method and procedure between a terminal and a small base station described above.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A small base station, comprising: an uplink resource control unit to allocate to all terminals a preamble index for a random access for a physical layer or a scheduling identifier that are in the small base station for the random access process or a Radio Resource Control (RRC) connection when each of the terminals are registered in the small base station, before RRC connection of each of the terminals; a transmitting/receiving unit to receive a random access request message from each of the terminals using the preamble index or the scheduling identifier, to transmit a reply message to each of the terminals for the random access, and to receive terminal information about each of the terminals and a RRC connection request message from each of the terminals in response to the reply message; and a verification unit to verify whether the small base station provides service to each of the terminals using the terminal information about each of the terminals, wherein the transmitting/receiving unit makes the RRC connection with each of the terminals in response to the RRC connection request message, when the small base station provides service to each of the terminals.

2. The small base station of claim 1, wherein the transmitting/receiving unit transmits the reply message and information request message to verify whether the small base station provides the service to each of the terminals.

3. The small base station of claim 2, wherein the terminal information about each of the terminals includes information to verify whether each of the terminals is the registered terminal, or unique identification information of each of the terminals.

4. A small base station, comprising: an uplink resource control unit to allocate an uplink resource for allowing the small base station service to all terminals, when an uplink resource request message is received; a transmitting/receiving unit to receive a terminal information transmitted using the uplink resource allocated by the uplink resource control unit, from each of the terminals and a verification unit to verify whether the small base station provides service to each of the terminals using the terminal information, wherein the uplink resource control unit transmits a terminal information transmission request message to each of the terminals when the service is discontinued, and the transmitting/receiving unit transmits the terminal information received from each of the terminals in response to the terminal information transmission request message to the terminal verification unit, wherein an uplink physical layer synchronization is unnecessary for the small base station.

5. The small base station of claim 4, further comprising:
a terminal verification unit to verify whether each of the terminals is a registered terminal using terminal information,
wherein the uplink resource control unit transmits a terminal information transmission request message to each of the terminals when allocating the uplink resource to each of the terminals, and the transmitting/receiving unit transmits the terminal information to the terminal verification unit in response to the terminal information transmission request message, the terminal information being transmitted from each of the terminals.

6. The small base station of claim 4, wherein the uplink resource control unit discontinues allocating the uplink resource to each of the terminals, when the terminal verification unit does not verify that the small base station provides service to at least one of the terminal.

7. The small base station of claim 4, wherein the uplink resource control unit transmits the terminal information transmission request message to each of the terminals, when retransmitting the terminal information after discontinuing the transmission of the terminal information.

8. The small base station of claim 4, wherein the transmitting/receiving unit receives the information from each of the terminals, using the resource request uplink allocated by the resource allocation unit, or using the uplink resource allocated by the uplink resource control unit.

9. The small base station of claim 4, further comprising:
a downlink resource control unit to inform to each of the terminals that downlink information is to be received, using a scheduling identifier, when the downlink information to be transmitted to each of the terminals exists,
wherein, when the downlink resource control unit informs to each of the terminals that the downlink information is to be received, the uplink resource control unit allocates the uplink resource to each of the terminals, and the transmitting/receiving unit transmits the downlink information to each of the terminals.

* * * * *